US012620001B1

(12) United States Patent
Ostos et al.

(10) Patent No.: US 12,620,001 B1
(45) Date of Patent: May 5, 2026

(54) PROMOTION PROCESSING SYSTEM INCLUDING AI-BASED PROMOTION PARAMETER ADJUSTMENT AND RELATED METHODS

(71) Applicant: Inmar Brand Solutions, Inc., Winston-Salem, NC (US)

(72) Inventors: Pia Ostos, Newton, MA (US); Sean A. Briscoe, Greensboro, NC (US); Jeffery A. Clouse, Jamestown, NC (US); Samuel Edeh, Lawrenceville, GA (US); Tom Fogarty, Detroit, MI (US); Vidya Vijayakumar, San Antonio, TX (US); Rob Yee, Milford, OH (US)

(73) Assignee: INMAR BRAND SOLUTIONS, INC., Winston-Salem, NC (US)

( * ) Notice: Subject to any disclaimer, the term of this patent is extended or adjusted under 35 U.S.C. 154(b) by 0 days.

(21) Appl. No.: 18/634,955

(22) Filed: Apr. 14, 2024

(51) Int. Cl.
*G06Q 30/0207* (2023.01)
*G06Q 30/0238* (2023.01)

(52) U.S. Cl.
CPC ..... *G06Q 30/0224* (2013.01); *G06Q 30/0238* (2013.01)

(58) Field of Classification Search
None
See application file for complete search history.

(56) References Cited

U.S. PATENT DOCUMENTS

| | | | |
|---|---|---|---|
| 9,342,835 B2 | 5/2016 | Fordyce, III et al. | |
| 9,984,387 B2 | 5/2018 | Moran | |
| 10,096,043 B2 | 10/2018 | Beck et al. | |
| 10,354,267 B2 | 7/2019 | Carlson et al. | |
| 10,607,169 B1* | 3/2020 | Carlisle .............. | G06Q 30/0246 |
| 10,956,924 B2 | 3/2021 | Carlson et al. | |
| 11,636,504 B2 | 4/2023 | Ventrice et al. | |
| 12,277,573 B1* | 4/2025 | Sandgren ........... | G06Q 30/0224 |
| 2018/0341965 A1* | 11/2018 | Rapperport ........ | G06Q 30/0255 |
| 2020/0019987 A1* | 1/2020 | Viola ................. | G06Q 30/0252 |
| 2020/0175544 A1* | 6/2020 | Bennett .............. | G06Q 30/0201 |

* cited by examiner

*Primary Examiner* — Allan J Woodworth, II
(74) *Attorney, Agent, or Firm* — ALLEN, DYER, DOPPELT, + GILCHRIST, P.A.

(57) ABSTRACT

A promotion processing system may include a brand user device associated with a brand, and shopper devices each associated with a shopper from among shoppers. The system may also include a promotion processing server configured to store historical purchase data for the shoppers, obtain desired promotion data via the brand user device, and operate an artificial intelligence (AI) model accepting as input the desired promotion data and the historical purchase data and generating as output a recommended digital promotion. The server may also communicate the recommended digital promotion to the brand user device and cooperate with the brand user device to obtain a selected digital promotion from the recommended digital promotion. The server may also operate the AI model to adjust a promotion parameter for the selected digital promotion and communicate the selected digital promotion with the corresponding adjusted promotion parameter for display at the shopper devices.

13 Claims, 9 Drawing Sheets

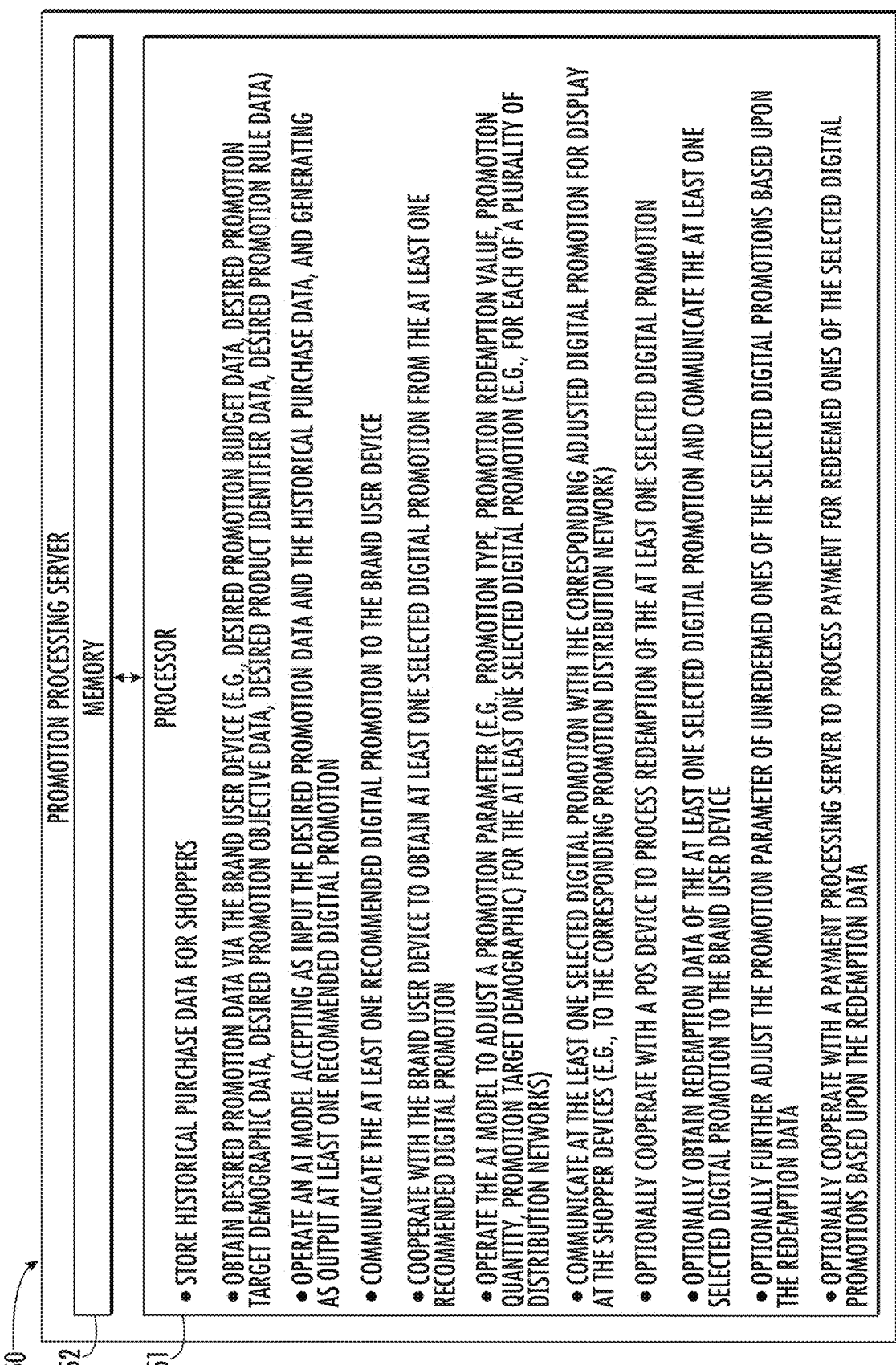

PROMOTION PROCESSING SERVER

MEMORY

PROCESSOR

• STORE HISTORICAL PURCHASE DATA FOR SHOPPERS

• OBTAIN DESIRED PROMOTION DATA VIA THE BRAND USER DEVICE (E.G., DESIRED PROMOTION BUDGET DATA, DESIRED PROMOTION TARGET DEMOGRAPHIC DATA, DESIRED PROMOTION OBJECTIVE DATA, DESIRED PRODUCT IDENTIFIER DATA, DESIRED PROMOTION RULE DATA)

• OPERATE AN AI MODEL ACCEPTING AS INPUT THE DESIRED PROMOTION DATA AND THE HISTORICAL PURCHASE DATA, AND GENERATING AS OUTPUT AT LEAST ONE RECOMMENDED DIGITAL PROMOTION

• COMMUNICATE THE AT LEAST ONE RECOMMENDED DIGITAL PROMOTION TO THE BRAND USER DEVICE

• COOPERATE WITH THE BRAND USER DEVICE TO OBTAIN AT LEAST ONE SELECTED DIGITAL PROMOTION FROM THE AT LEAST ONE RECOMMENDED DIGITAL PROMOTION

• OPERATE THE AI MODEL TO ADJUST A PROMOTION PARAMETER (E.G., PROMOTION TYPE, PROMOTION VALUE, PROMOTION QUANTITY, PROMOTION TARGET DEMOGRAPHIC) FOR THE AT LEAST ONE SELECTED DIGITAL PROMOTION (E.G., FOR EACH OF A PLURALITY OF DISTRIBUTION NETWORKS)

• COMMUNICATE AT THE LEAST ONE SELECTED DIGITAL PROMOTION WITH THE CORRESPONDING ADJUSTED DIGITAL PROMOTION FOR DISPLAY AT THE SHOPPER DEVICES (E.G., TO THE CORRESPONDING PROMOTION DISTRIBUTION NETWORK)

• OPTIONALLY COOPERATE WITH A POS DEVICE TO PROCESS REDEMPTION OF THE AT LEAST ONE SELECTED DIGITAL PROMOTION

• OPTIONALLY OBTAIN REDEMPTION DATA OF THE AT LEAST ONE SELECTED DIGITAL PROMOTION AND COMMUNICATE THE AT LEAST ONE SELECTED DIGITAL PROMOTION TO THE BRAND USER DEVICE

• OPTIONALLY FURTHER ADJUST THE PROMOTION PARAMETER OF UNREDEEMED ONES OF THE SELECTED DIGITAL PROMOTIONS BASED UPON THE REDEMPTION DATA

• OPTIONALLY COOPERATE WITH A PAYMENT PROCESSING SERVER TO PROCESS PAYMENT FOR REDEEMED ONES OF THE SELECTED DIGITAL PROMOTIONS BASED UPON THE REDEMPTION DATA

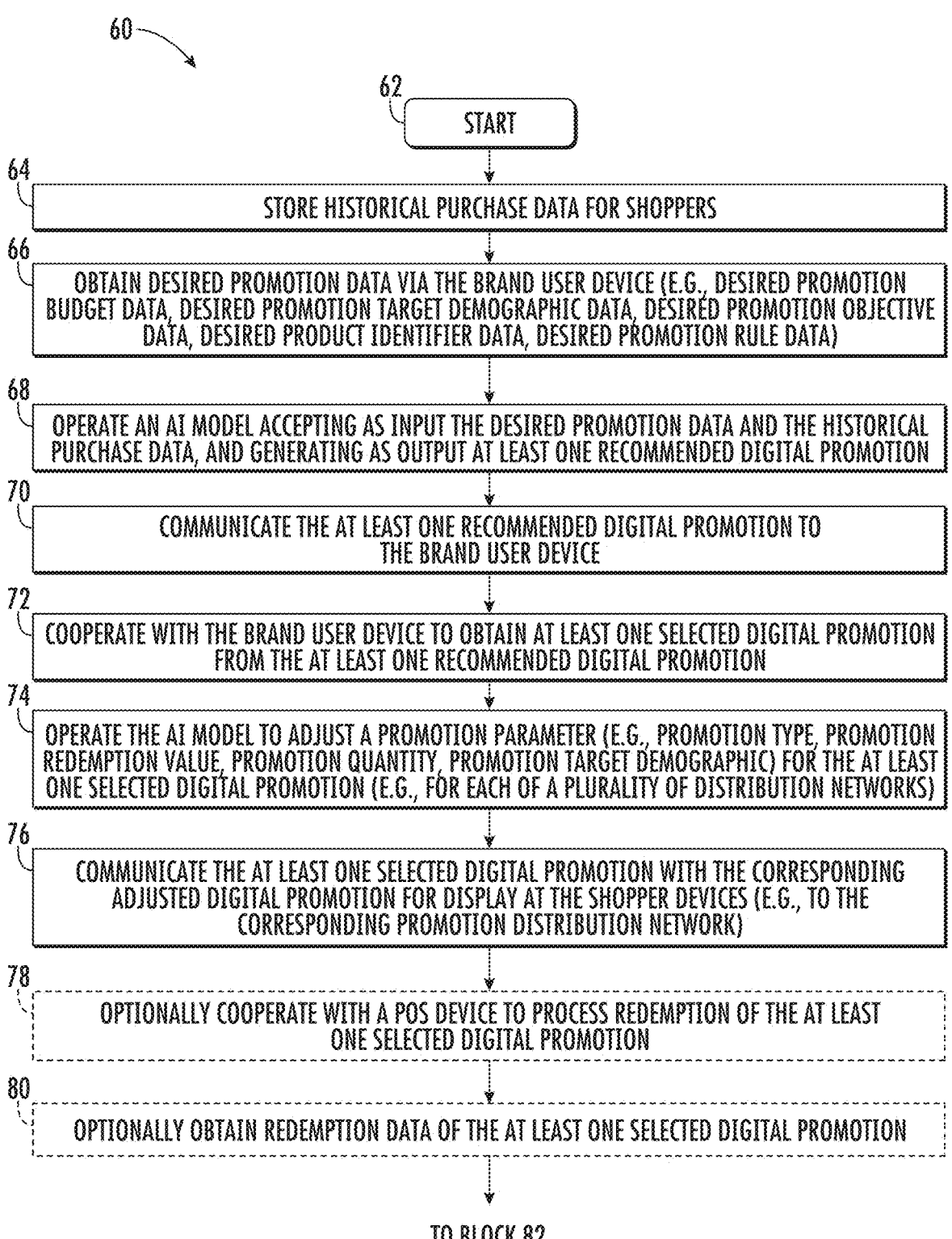

60

62
START

64
STORE HISTORICAL PURCHASE DATA FOR SHOPPERS

66
OBTAIN DESIRED PROMOTION DATA VIA THE BRAND USER DEVICE (E.G., DESIRED PROMOTION BUDGET DATA, DESIRED PROMOTION TARGET DEMOGRAPHIC DATA, DESIRED PROMOTION OBJECTIVE DATA, DESIRED PRODUCT IDENTIFIER DATA, DESIRED PROMOTION RULE DATA)

68
OPERATE AN AI MODEL ACCEPTING AS INPUT THE DESIRED PROMOTION DATA AND THE HISTORICAL PURCHASE DATA, AND GENERATING AS OUTPUT AT LEAST ONE RECOMMENDED DIGITAL PROMOTION

70
COMMUNICATE THE AT LEAST ONE RECOMMENDED DIGITAL PROMOTION TO THE BRAND USER DEVICE

72
COOPERATE WITH THE BRAND USER DEVICE TO OBTAIN AT LEAST ONE SELECTED DIGITAL PROMOTION FROM THE AT LEAST ONE RECOMMENDED DIGITAL PROMOTION

74
OPERATE THE AI MODEL TO ADJUST A PROMOTION PARAMETER (E.G., PROMOTION TYPE, PROMOTION REDEMPTION VALUE, PROMOTION QUANTITY, PROMOTION TARGET DEMOGRAPHIC) FOR THE AT LEAST ONE SELECTED DIGITAL PROMOTION (E.G., FOR EACH OF A PLURALITY OF DISTRIBUTION NETWORKS)

76
COMMUNICATE THE AT LEAST ONE SELECTED DIGITAL PROMOTION WITH THE CORRESPONDING ADJUSTED DIGITAL PROMOTION FOR DISPLAY AT THE SHOPPER DEVICES (E.G., TO THE CORRESPONDING PROMOTION DISTRIBUTION NETWORK)

78
OPTIONALLY COOPERATE WITH A POS DEVICE TO PROCESS REDEMPTION OF THE AT LEAST ONE SELECTED DIGITAL PROMOTION

80
OPTIONALLY OBTAIN REDEMPTION DATA OF THE AT LEAST ONE SELECTED DIGITAL PROMOTION

TO BLOCK 82

FIG. 3A

YOU SAVED $2
ON BABYBOT
NEW FORMULA!

PROMOTION PROCESSING SERVER

PRODUCT IDENTIFIERS FOR
PURCHASED PRODUCTS

48

45

YES

SAME?

47

SELECTED DIGITAL PROMOTION

53a

PRODUCT IDENTIFIER

46a

SELECTED DIGITAL PROMOTION

53c

PRODUCT IDENTIFIER

46c

50

PROMOTION PROCESSING SYSTEM INCLUDING AI-BASED PROMOTION PARAMETER ADJUSTMENT AND RELATED METHODS

TECHNICAL FIELD

The present invention relates to the field of promotion processing, and, more particularly, to adjusting a promotion parameter, and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Another type of promotion is a rebate. A rebate, similarly to a coupon, also has a redeemable value and is redeemable toward a purchase of a given product. However, a rebate is typically provided, in terms of redeemable value, to the shopper, post purchase. For example, a shopper, to qualify for the rebate, may have to provide a proof-of-purchase to a manufacturer or retailer to qualify for the rebate.

A coupon or rebate may be distributed to a shopper using one or more different distribution networks. For example, a coupon may be distributed both in a print advertisement or circular and as a digital coupon. Digitally, a coupon may be distributed over any of a website, coupon distribution application, or loyalty application, for example.

U.S. Pat. No. 10,956,924 to Carlson et al. discloses a method for the provision, on a computing apparatus, of a user interface configured via a portal to permit a merchant to define an offer campaign. The offer has a plurality of milestones required to be met to provide a benefit to a user. The computing apparatus may be further configured to associate the offer with a user, detect the progress of the user toward the milestone, and transmit a message to the user regarding the user's progress toward the milestone.

U.S. Pat. No. 10,096,043 to Beck et al. discloses a computing apparatus is configured to formulate and adjust offers to users of mobile devices that are configured to capture identification information of products, such as UPC codes. The transaction data of the user, the activities of the user capturing the identification information of products, the location of the user, and the user's reactions to the offers are used to incrementally adjust the offers according to offer rules specified by the merchants. The mobile devices can be used to initiate a checkout process for purchasing items identified by the captured identification information of the products from the physical retail store at which the user is currently located, or via an online store associated with an offer presented via the mobile device.

SUMMARY

A promotion processing system may include a brand user device associated with a brand, and a plurality of shopper devices each associated with a shopper from among a plurality of shoppers. The promotion processing server may also include a promotion processing server configured to store historical purchase data for the plurality of shoppers and obtain desired promotion data via the brand user device. The promotion processing server may also be configured to operate an artificial intelligence (AI) model accepting as input the desired promotion data and the historical purchase data and generating as output at least one recommended digital promotion.

The promotion processing server may further be configured to communicate the at least one recommended digital promotion to the brand user device and cooperate with the brand user device to obtain at least one selected digital promotion from the at least one recommended digital promotion. The promotion processing server may also be configured to operate the AI model to adjust a promotion parameter for the at least one selected digital promotion, and communicate the at least one selected digital promotion with the corresponding adjusted promotion parameter for display at the plurality of shopper devices.

The promotion processing server may be configured to operate the AI model to adjust the promotion parameter for each of a plurality of promotion distribution networks. The promotion processing server may be configured to communicate the at least one selected digital promotion with the corresponding adjusted promotion parameter to the corresponding promotion distribution network, for example.

The promotion processing server may be configured to obtain redemption data of the at least one selected digital promotion and communicate the redemption data to the brand user device. The promotion processing server may be configured to further adjust the promotion parameter of unredeemed ones of the at least one selected digital promotion based upon the redemption data. The promotion processing server may be configured to cooperate with a payment processing server to process payment for redeemed ones of the at least one selected digital promotion based upon the redemption data, for example.

The promotion processing server may be configured to cooperate with a point-of-sale (POS) device to process redemption of the at least one selected digital promotion. The promotion parameter may include one of a promotion type, a promotion redemption value, a promotion quantity, and a promotion target demographic, for example. The desired promotion data may include at least one of desired promotion budget data, desired promotion target demographic data, desired promotion objective data, desired product identifier data, and desired promotion rule data, for example.

A method aspect is directed to a method of processing a promotion. The method may include using a promotion processing server to store historical purchase data for a plurality of shoppers each associated with a shopper device, and obtain desired promotion data via a brand user device associated with a brand. The method may also include using the promotion processing server to operate an artificial intelligence (AI) model accepting as input the desired promotion data and the historical purchase data and generating as output at least one recommended digital promotion. The method may also include using the promotion processing server to communicate the at least one recommended digital promotion to the brand user device, cooperate with the brand user device to obtain at least one selected digital promotion from the at least one recommended digital promotion, and operate the AI model to adjust a promotion parameter for the at least one selected digital promotion. The method may further include using the promotion processing server to communicate the at least one selected digital promotion with the corresponding adjusted promotion parameter for display at the plurality of shopper devices.

A computer readable medium aspect is directed to a non-transitory computer readable medium for processing a promotion, the non-transitory computer readable medium including computer executable instructions that when executed by a processor cause the processor to perform operations. The operations may include storing historical purchase data for a plurality of shoppers each associated with a shopper device and obtaining desired promotion data via a brand user device associated with a brand. The operations may also include operating an artificial intelligence (AI) model accepting as input the desired promotion data and the historical purchase data, and generating as output at least one recommended digital promotion and communicating the at least one recommended digital promotion to the brand user device. The operations may further include cooperating with the brand user device to obtain at least one selected digital promotion from the at least one recommended digital promotion, and operating the AI model to adjust a promotion parameter for the at least one selected digital promotion. The operations may also include communicating the at least one selected digital promotion with the corresponding adjusted promotion parameter for display at the plurality of shopper devices.

BRIEF DESCRIPTION OF THE DRAWINGS

FIG. 2 is a schematic block diagram of the promotion processing server of FIG. 1.

FIGS. 3A and 3B are flow diagrams of operation of the promotion processing server of FIG. 1.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
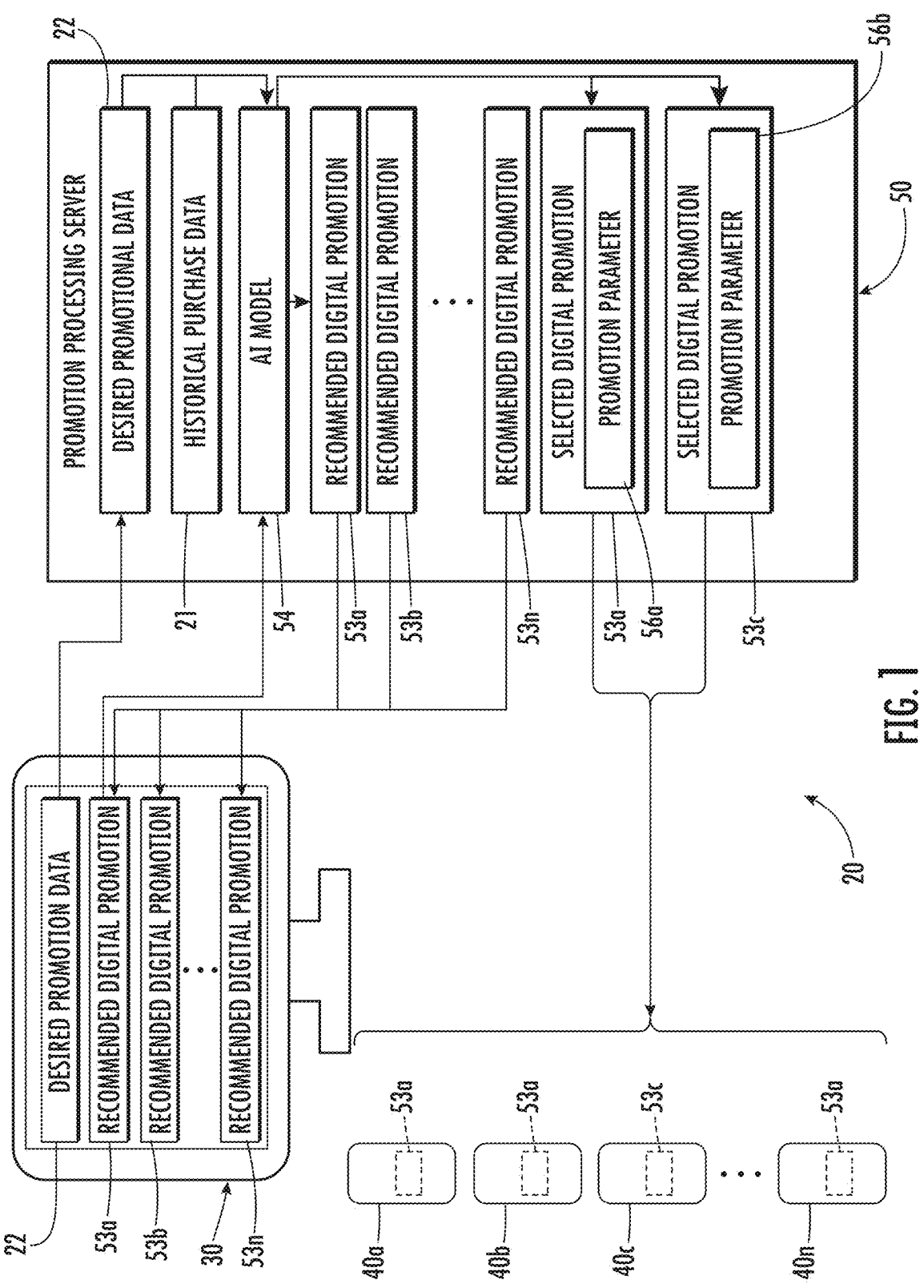
FIG. 1 is a schematic diagram of a promotion processing system in accordance with an embodiment.

Referring initially to FIGS. 1 and 2, a promotion processing system 20 includes a brand user device 30 associated with a brand. The brand user device 30 is illustratively in the form of a desktop computer. The brand user device 30 may be another type of device, for example, a laptop computer, tablet computer, mobile wireless communications device, such as, for example, a smartphone, or a wearable device.

Shopper devices 40a-40n are each associated with respective shoppers. The shopper devices 40a-40n are illustratively in the form of mobile wireless communications devices, and, more particularly, smartphones. Of course, the shopper devices 40a-40n may be another or different types of devices, for example, desktop computer, laptop computer, tablet computer, or wearable computer.

The promotion processing system 20 includes a promotion processing server 50. The promotion processing server 50 includes a processor 51 and an associated memory 52. While operations of the promotion processing server 50 are described herein, the processor 51 and the memory 52 cooperate to perform the operations.

Figure 3B:
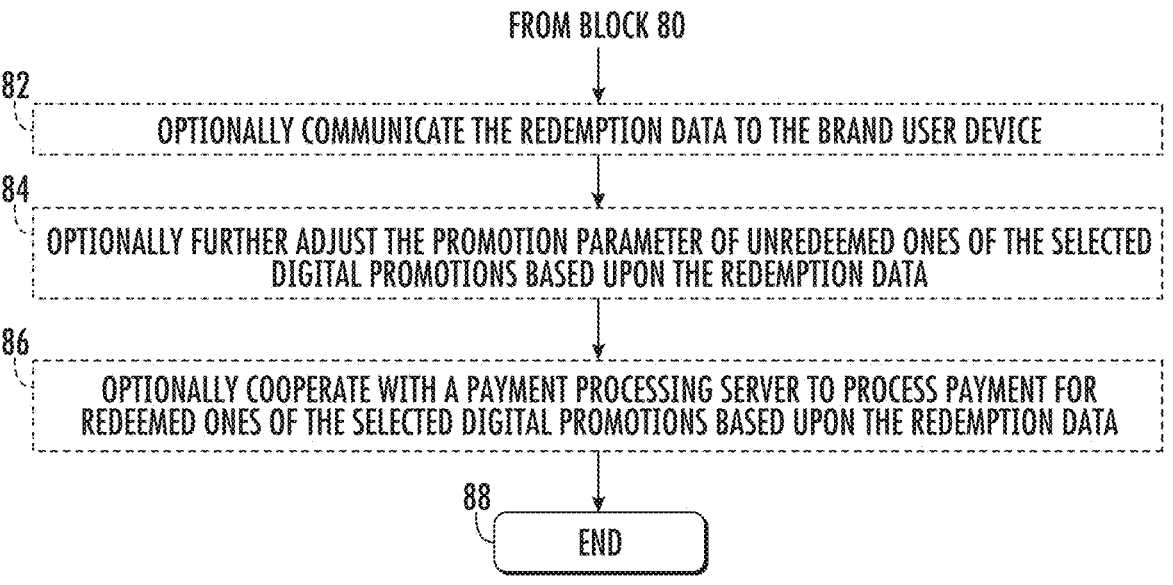

Referring now additionally to the flowchart 60 in FIGS. 3A and 3B, beginning at Block 62, operation of the promotion processing server 50 will now be described. At Block 64, the promotion processing server 50 stores historical purchase data 21 for the shoppers. Historical purchase data 21 may include, for each shopper, dates and times of purchases, retailers at which purchases are made (e.g., geographic locations), purchased products (e.g., identified by unique identifiers, such as, uniform product code (UPC), stock keeping unit (SKU), or other unique identifier), quantities of purchased products (e.g., on a per-shopping trip or cumulative basis), prices paid for products, order totals, and whether a digital promotion or coupon was applied (e.g., and if so, the amount and/or products for which the promotion was redeemed). The historical purchase data 21 may include other and/or additional purchase data.

The promotion processing server 50 may obtain the historical purchase data 21 by interfacing with one or more retailer loyalty programs. For example, the promotion processing server 50 may operate one or more retailer loyalty programs each with stored historical purchase data 21 associated with shoppers. The promotion processing server 50 may obtain purchase data in real time, which, upon storing, becomes historical purchase data 21. The promotion processing server 50 may obtain the historical purchase data 21 from point-of-sale (POS) terminals or devices at retailers, for example, as transactions are being processing or as products are being scanned or purchased. Other data, for example, associated with the historical purchase data 21, such as, for example, shopper information (gender, age, income range) may be obtained by the promotion processing server 50, for example, via a loyalty program.

Figure 4:
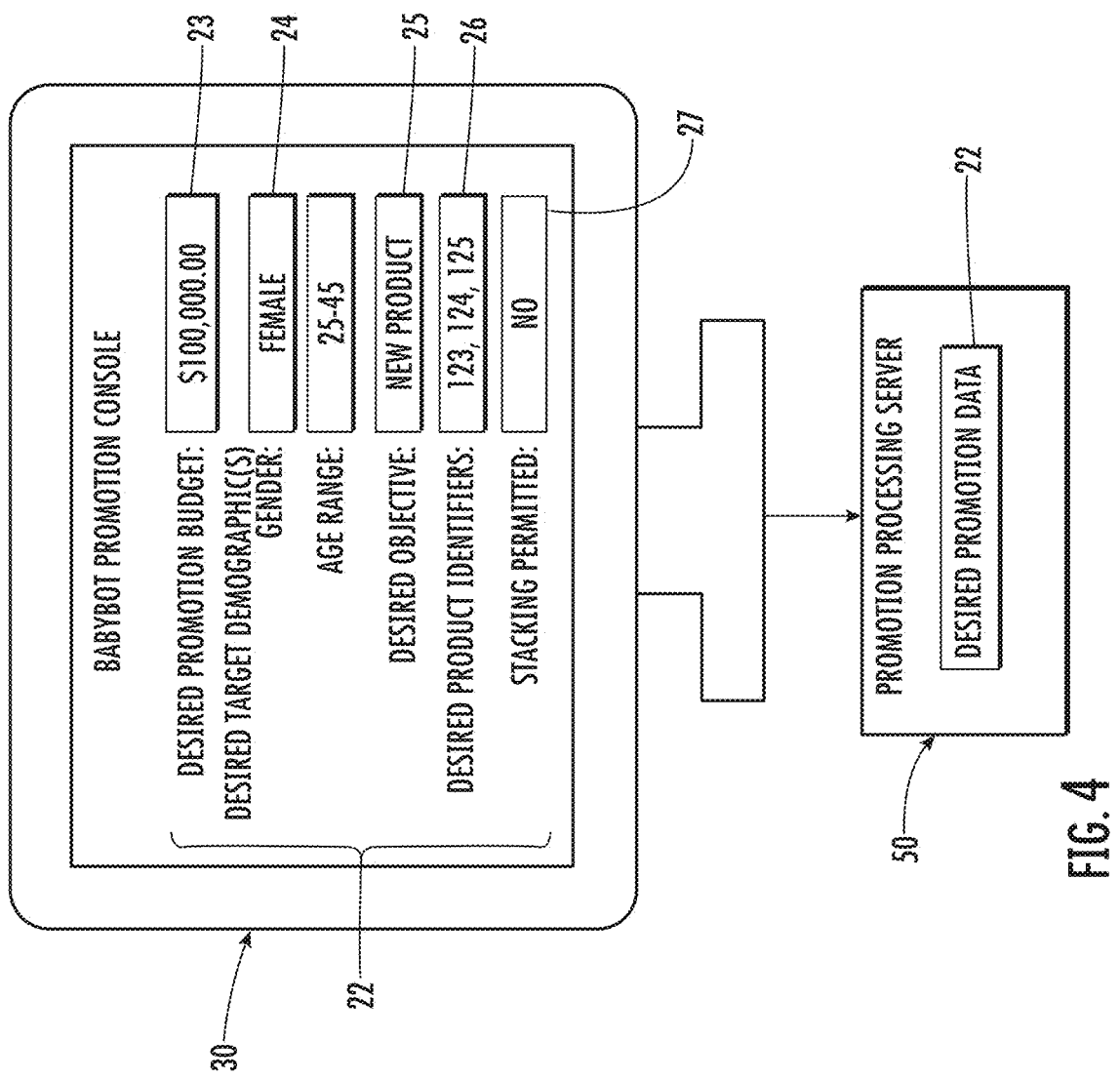
FIG. 4 is a schematic diagram of a portion of the promotion processing system of FIG. 1 illustrating obtaining desired promotion data.

Referring now additionally to FIG. 4, the promotion processing server 50, at Block 66, obtains desired promotion data 22 via the brand user device 30. More particularly, the promotion processing server 50 and the brand user device 30 communicate with each other, for example, wirelessly, over the Internet or other network, to obtain the desired promotion data 22. In an exemplary embodiment, a brand user may enter or provide, via input to the brand user device 30, desired promotion budget data 23, desired promotion target demographic data 24, desired promotion objective data 25, desired product identifier data 26, and/or desired promotion rule data 27. Desired promotion rule data 27 may include rule data as to whether a given promotion may be stacked, whether other or additional products are to be purchased to qualify for a promotion, whether there are quantity limits, etc. Desired product identifier data 26 may include product descriptions, one or more product unique identifiers, for example, UPCs or SKUs. Desired promotion objective data 25 may include an indication of whether the product is new (new product trial) to educate, increase product reach or raise brand awareness, etc. Desired promotion target demographic data 24 may include desired age range, gender range, marriage status, and/or income data. Desired promotional budget data 23 may include a desired spend for a promotional campaign, for example.

Illustratively, the brand user enters, by way of form fields, the desired promotion data 22 as input to the brand user device 30. These input fields, collectively defining the desired promotion data 22, are communicated to the promotion processing server 50. In an exemplary implementation example, a brand "Babybot" may be desirous of introducing a new baby formula product. The goal is brand awareness and trial of the new product among mom ages 25-45. The budget for "Babybot" is $100 k.

The promotion processing server 50 operates an artificial intelligence (AI) model 54 to generate recommended digital promotions 53a-53n (Block 68) each having corresponding promotion parameters 56. While three recommended digital promotions 53a-53n are illustrated, those skilled in the art will appreciate that there may be any number of digital promotions. More particularly, the AI model 54 accepts as input the desired promotion data 22 and the historical purchase data 21. The AI model 54 may apply one or more algorithms that are relevant to the desired promotion data 22 and the historical purchase data. The algorithms may include machine learning algorithms, and, more particularly, deep learning algorithms such that the AI model 54 may be a deep learning model that recognizes patterns in and is trained by the desired promotion data 22 and the historical purchase data 21.

Figure 5:
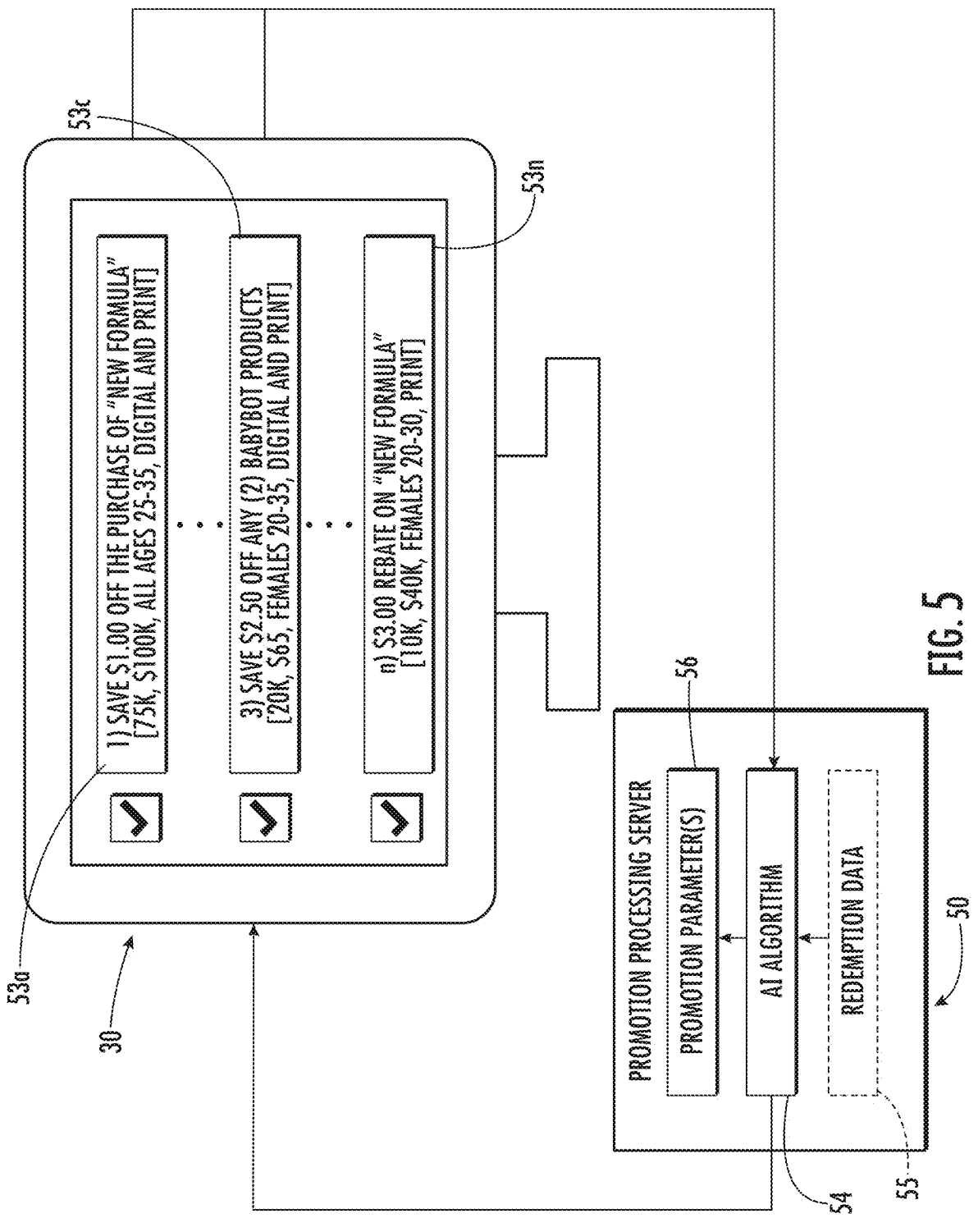
FIG. 5 is a schematic diagram of a portion of the promotion processing system of FIG. 1 illustrating selected digital promotions.

Referring additionally to FIG. 5, in some embodiments, redemption data 55 associated with digital promotions may also be accepted as an input to the AI model 54. Thus, the AI model 54 may predict the recommended digital promotions 53a-53n (including corresponding promotion parameters 56) that are likely to be redeemed or the associated product for purchase purchased.

The desired promotion data 22 and the historical purchase data 21 may be stored as embeddings, which may allow for relatively quick identification of similarities and relationships. As will be appreciated by those skilled in the art, embeddings may be created by unsupervised neural network layers, which permits items of information to be converted into vectors, for example, positioning them within a mathematical space relative to the other data items from among the desired promotion data 22 and the historical purchase data 21. Embeddings that become clustered can be considered relevant to each other, allowing for relatively quick pattern identification. For example, diaper purchases, coupon usage, and non-brand loyalty are "close" to each other in an embeddings database, the AI model 54 may predict that mothers (e.g., ages 25-45) may be more apt to try a new baby product.

The recommended digital promotions 53a-53n are communicated to the brand user device 30 (Block 70). The recommended digital promotions 53a-53n may be displayed on the display of the brand user device 30 in the form of a list. Each displayed recommended digital promotion 53a-53n may be user selectable by the brand, for example.

The promotion processing server 50 cooperates with the brand user device 30 to obtain one or more selected digital promotions 53a, 53c from the recommended digital promotions 53a-53n (Block 72). More particularly, the brand user may provide selection input to the brand user device 30 to select which digital promotion or promotions the brand wishes to pursue. The promotion processing server 50 and the brand user device 30 communicate so that the selected digital promotions 53a, 53c are communicated to the promotion processing server.

Figure 6:
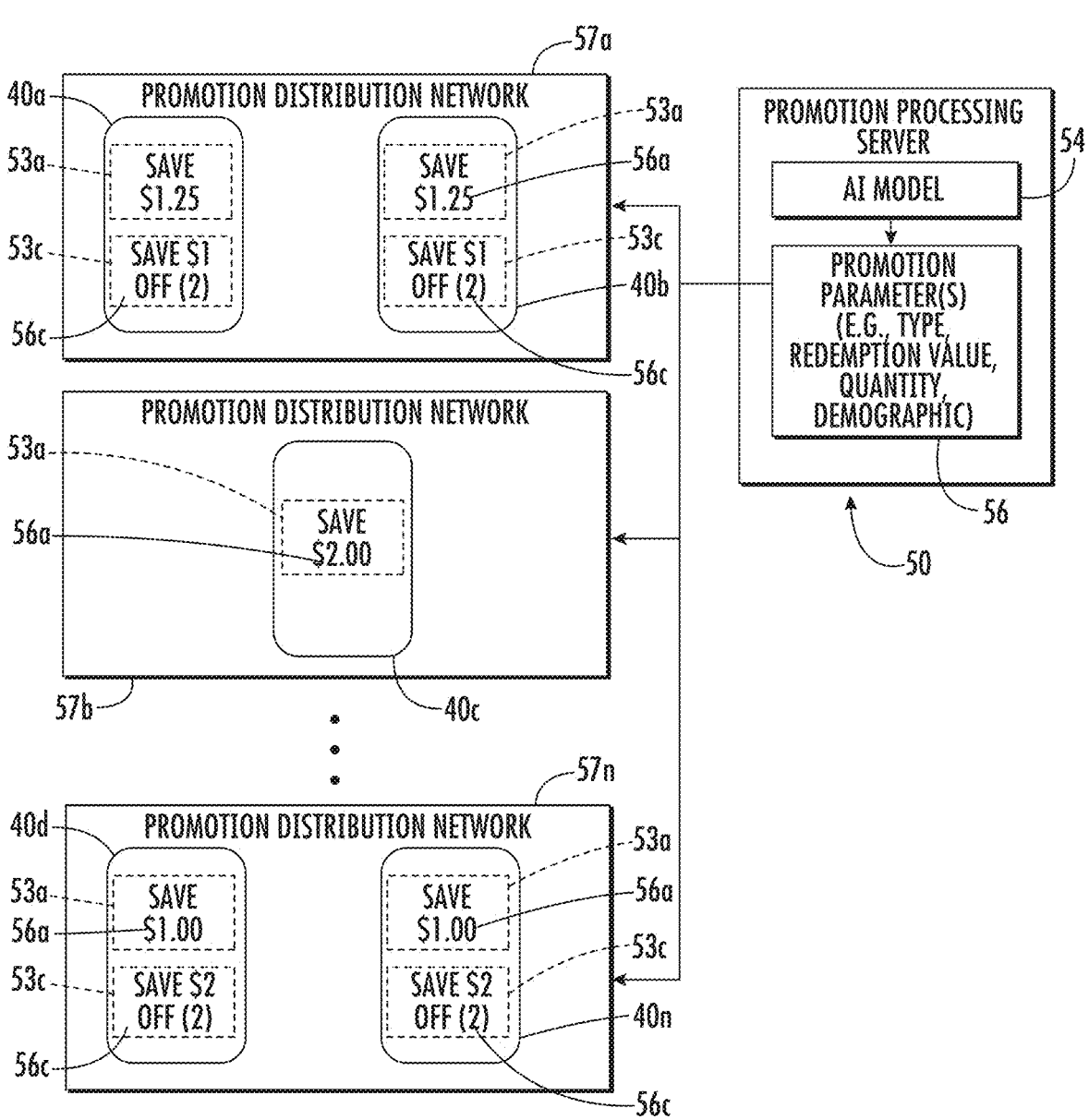
FIG. 6 is a schematic diagram of a portion of the promotion processing system of FIG. 1 illustrating distribution of selected digital promotions to respective promotion distribution networks.

Referring additionally to FIG. 6, at Block 74, the promotion processing server 50 operates the AI model 54 to adjust one or more promotion parameters 56a, 56c for the selected digital promotions 53a, 53c. Promotion parameters 56a, 56c may include, for example, a promotion type (e.g., coupon, rebate), a promotion redemption value (e.g., $1.00 OFF), a promotion quantity (e.g., 1000 promotions to be distributed), a promotion demographic (e.g., age, gender, income, geographic location), and/or a promotion budget by network (e.g., $50 k social media, $25 k retailer loyalty application, etc.). In an embodiment, the promotion processing server 50 may operate the AI model 54 to adjust the promotion parameters 56 based upon respective promotion distribution networks 57a-57n or distribution channels (e.g., distribution media). For example, the promotion processing server 50 may operate a distribution engine that implements the selected digital promotions 53a, 53c by adjusting the promotion parameter 56a, 56c for interoperability with respective promotion distribution networks 57a-57n. Exemplary promotion distribution networks 57a-57n may include retailer loyalty programs, individual or third-party coupon or promotion distribution applications, social media, or networks. In other words, the selected digital promotions 53a, 53c may have different promotion parameters 56a, 56c for each promotion distribution network 57a-57n to which the selected digital promotions are communicated. The promotion parameters 56a, 56c may be independently adjusted for each promotion distribution network 57a-57n.

The promotion processing server 50 communicates the selected digital promotions 53a, 53c with the corresponding adjusted promotion parameter or parameters 56 for display at the shopper devices 40a-40n (Block 76) (FIG. 6). More particularly, the selected digital promotions 53a, 53c may be displayed on the shopper devices 40a-40n via the respective promotion distribution networks 57a-57n (e.g., social media, third party coupon application, retailer loyalty application). As will be appreciated by those skilled in the art, by adjusting one or more of the promotion parameters 56a, 56c, the selected digital promotions 53a, 53c may be optimized for each promotion distribution network 57a-57n.

Each promotion distribution network 57a-57n may have different promotion reception characteristics such that a given shopper receiving a digital promotion via one promotion distribution network may be more responsive than another promotion distribution network. Moreover, each promotion distribution network 57a-57n may have a different operating cost, such that, when considered in terms of return, may not be as desired over another or different promotion distribution network. The promotion processing system 20 may thus, via operation of the AI model 54, adjust or optimize the parameters so that the brand or manufacturers receive an increased (e.g., highest) return. In other words, for example, a given brand or manufacturer may have less of a return on a promotion if all the promotions (and all promotion budget) were communicated through one promotion distribution network 57a-57n.

Each shopper may save the communicated selected digital promotion 53a, 53c to a digital wallet associated with the given shopper. The promotion processing server 50 may store the digital wallet for the given shopper, for example, in embodiments where the promotion processing server also operates a loyalty program for the corresponding retailer, as will be appreciated by those skilled in the art.

Figure 7:
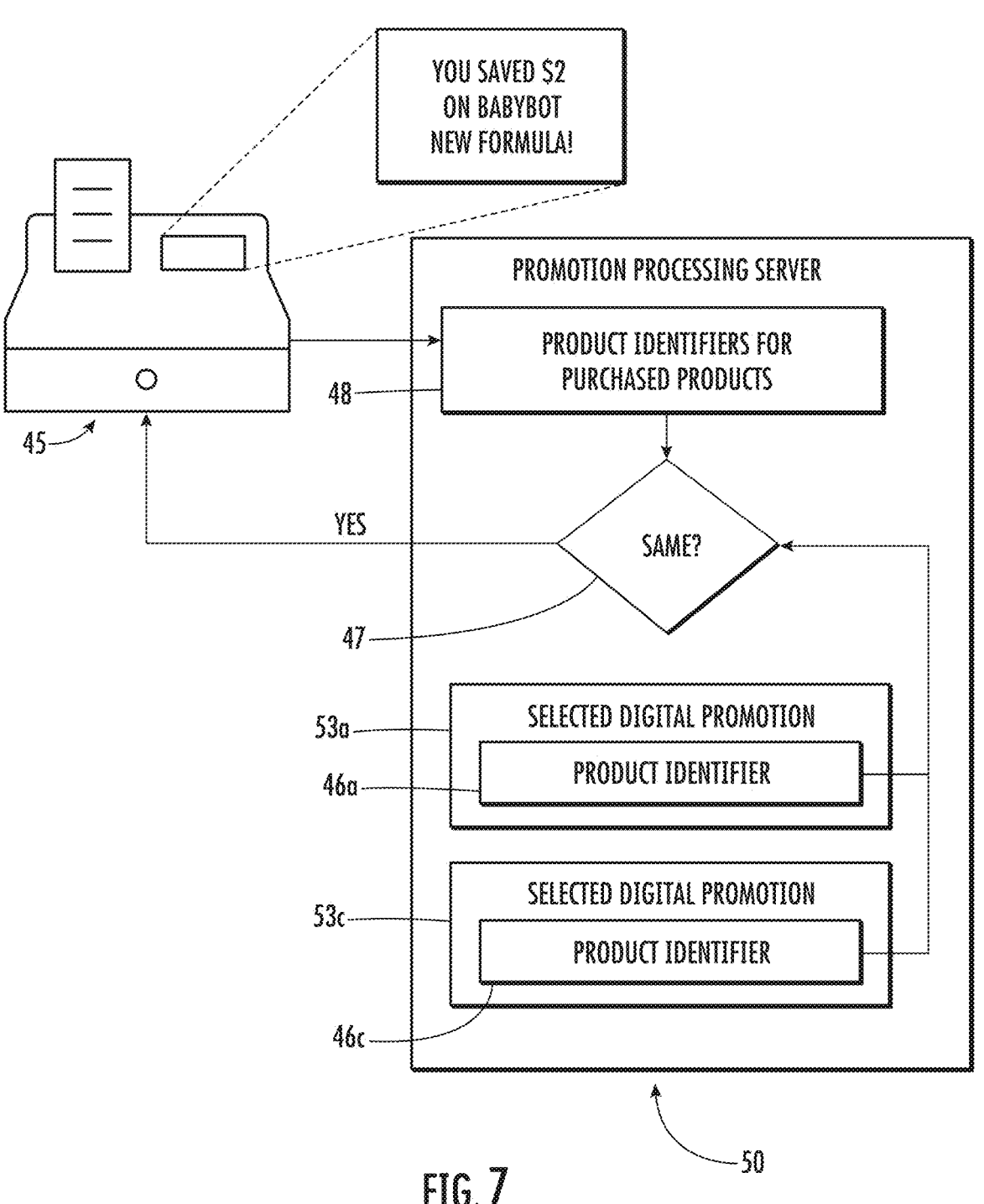
FIG. 7 is a schematic diagram of a portion of the promotion processing system of FIG. 1 illustrating redemption of a selected digital promotion.

Referring additionally to FIG. 7, the promotion processing server 50 may, in some embodiments, cooperate with a POS device 45 to process redemption of the selected digital promotions 53a, 53c (Block 78). The promotion processing server 50 may obtain product identifiers 46a, 46c from the POS device 45 as products are being purchased. Other information may also be obtained, for example, shopper identification information. The promotion processing server 50 may validate the selected digital promotions 53a, 53c presented for redemption, for example, by comparing 47 the product identifiers 48 for the products being purchased to the corresponding product identifiers 46a, 46b for the selected digital promotions 53a, 53n. The promotion processing server 50 may perform other and/or additional validation techniques, as will be appreciated by those skilled in the art.

The promotion processing server 50, at Block 80, may, in some embodiments, obtain redemption data 55 associated with the selected digital promotions 53a, 53c. The promotion processing server 50 may obtain the redemption data 55 based upon communication with the POS devices 45. In embodiments where the promotion processing server 50 operates a loyalty program, for example, for one or more retailers, the promotion processing server may obtain the redemption data 55 based upon accessing respective loyalty program databases, which store product purchase histories, including redemption data, as described above.

Figure 8:
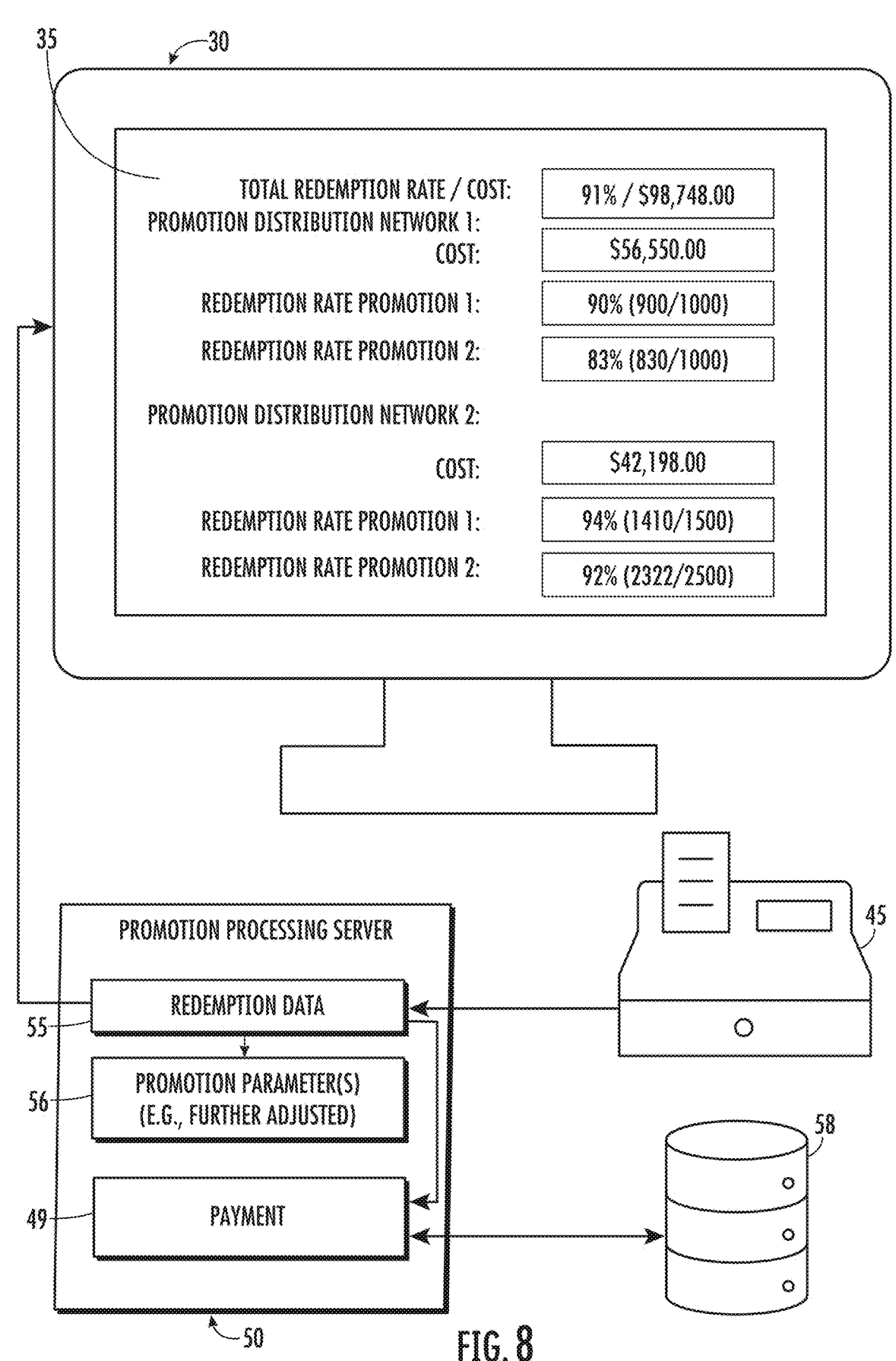
FIG. 8 is a schematic diagram of a portion of the promotion processing system of FIG. 1 illustrating payment processing and redemption reporting.

Referring additionally to FIG. 8, at Block 82, the promotion processing server 50 may communicate the redemption data 55 to the brand user device 30 for review and analysis by the brand or manufacturer. For example, the promotion processing server 50 may cooperate with the brand user device 30 (e.g., via a web or internet interface), to display a data dashboard 35, which tracks the redemption of the selected digital promotions 53a, 53c, and thus the efficiency of the promotion campaign.

The promotion processing server 50 may, in some embodiments, further adjust the promotion parameters 56 of unredeemed ones of the selected digital promotions 53a, 53c based upon the redemption data 55 (Block 84). For example, the promotion processing server 50 may adjust the promotion redemption value upwardly for underperforming redemption (e.g., to further entice shoppers to purchase the product). The promotion processing server 50 may reduce the promotion redemption value for overperforming redemption of the selected digital promotions 53a, 53c, or reduce the number of available digital promotions for redemption, such as, for example, to address a possible runaway redemption. In some embodiments, the promotion processing server 50 may further adjust the promotion parameters 56 based upon a change or reallocation of promotion distribution networks 57a-57n, for example.

The promotion processing server 50, at Block 86, may, in some embodiments, cooperate with a payment processing server 58 to process payment 49 for redeemed selected digital promotions 53a, 53c. The promotion processing server 50 may calculate a payment value based upon the redemption data 55, and more particularly, the promotion redemption value. For example, the promotion processing server 50 may determine the brand or manufacturer owes a given retailer one-thousand dollars based upon redemption of five-hundred digital promotions having a promotion redemption value of $0.50 each. The promotion processing server 50 may calculate other and/or additional payments to be processed based upon agreed upon processing fees, for example. The payment processing server 58 may be remote from the promotion processing server 50 and may be associated with a payment processor, for example. The payment processing server 58, based upon instructions from the promotion processing server 50, may initiate payment from the brand to the retailer and/or other payments, for example, by initiating an electronic funds transfer (EFT) or automated clearinghouse (ACH) payment, as will be appreciated by those skilled in the art. Operations end at Block 88.

As will be appreciated by those skilled in the art, the promotion processing system 20 described herein may conceptually provide an end-to-end consumer package goods (CPG) offer optimization and execution platform. By end-to-end, the promotion processing system 20 may continuously, on an on-going basis, and, in some embodiments, in real-time, analyze brand or manufacturer goals, recommend promotions, execute the promotions in the form of a campaign, monitor and adjust the promotion or campaign, and provide settlement. While the operations of the promotion processing server 50 have been described in a particular order, those skilled in the art will appreciate the operations may be performed in another or any order, either sequentially or in parallel. For example, during the promotion processing cycle described herein, the promotion processing server 50 may operate or adjust any step in the promotion processing cycle based upon a change in or changed input to the desired promotion data, which may occur before a previous promotion campaign (i.e., selected digital promotions 53a, 53c) has completed (e.g., by way of full redemption, reached budget amount, etc.).

A method aspect is directed to a method of processing a promotion. The method includes using a promotion processing server 50 to store historical purchase data 21 for a plurality of shoppers, each associated with a shopper device 40a-40n and obtain desired promotion data 22 via a brand user device 30 associated with a brand. The method also includes using the promotion processing server 50 to operate an artificial intelligence (AI) model 54 accepting as input the desired promotion data 22 and the historical purchase data 21 and generating as output at least one recommended digital promotion 53a-53n. The method also includes using the promotion processing server 50 to communicate the at least one recommended digital promotion 53a-53n to the brand user device 30, cooperate with the brand user device to obtain at least one selected digital promotion 53a, 53c from the at least one recommended digital promotion, and operate the AI model 54 to adjust a promotion parameter 56 for the at least one selected digital promotion. The method further includes using the promotion processing server 50 to communicate the at least one selected digital promotion 53a, 53c with the corresponding adjusted promotion parameter 56 for display at the plurality of shopper devices 40a-40n.

A computer readable medium aspect is directed to a non-transitory computer readable medium for processing a promotion, the non-transitory computer readable medium including computer executable instructions that when executed by a processor 51 cause the processor to perform operations. The operations include storing historical purchase data 21 for a plurality of shoppers each associated with a shopper device 40a-40n and obtaining desired promotion data 22 via a brand user device 30 associated with a brand.

The operations also include operating an artificial intelligence (AI) model 54 accepting as input the desired promotion data 22 and the historical purchase data 21, and generating as output at least one recommended digital promotion 53a-53n and communicating the at least one recommended digital promotion to the brand user device 30.

The operations further include cooperating with the brand user device 30 to obtain at least one selected digital promotion 53a, 53c from the at least one recommended digital promotion 53a-53n and operating the AI model 54 to adjust a promotion parameter 56 for the at least one selected digital promotion. The operations also include communicating the at least one selected digital promotion 53a, 53c with the corresponding adjusted promotion parameter 56 for display at the plurality of shopper devices 40a-40n.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
a brand user device associated with a brand;
a plurality of shopper devices each associated with a shopper from among a plurality of shoppers; and
a promotion processing server configured to
store historical purchase data for the plurality of shoppers,
cooperate with the brand user device to display a brand user device interface prompting for desired promotion data including desired overall promotion budget data, desired demographic data associated with a desired promotion, and desired promotion budget data for each of a plurality of promotion distribution networks,
cooperate with the brand user device to obtain the desired promotion data via the brand user device interface,
operate an artificial intelligence (AI) model accepting as input the desired promotion data and the historical purchase data and generating as output a plurality of recommended digital promotions for the plurality of promotion distribution networks,
communicate the plurality of recommended digital promotions to the brand user device for display at the brand user device,
communicate with the brand user device to prompt for selection of at least one selected digital promotion from the plurality of recommended digital promotions,
cooperate with the brand user device to obtain the at least one selected digital promotion,
operate the AI model to adjust a promotion parameter from among a plurality thereof for the at least one selected digital promotion and based upon the corresponding one of the plurality of promotion distribution networks, the plurality of promotion parameters comprising a promotion redemption value and a promotion quantity, communicate the at least one selected digital promotion with the corresponding adjusted promotion parameter to the corresponding promotion distribution network for display at the plurality of shopper devices via the respective promotion distribution network,
communicate with a plurality of point-of-sale (POS) devices to obtain redemption data associated with the at least one selected digital promotion, the redemption data comprising a redemption rate and promotion cost,
cooperate with the brand user device to determine a change in the desired promotion data, and
further adjust one of the plurality of promotion parameters of unredeemed ones of the at least one selected digital promotion based upon the redemption data and a change in the desired promotion data.

2. The promotion processing system of claim 1 wherein the promotion processing server is configured to cooperate with a payment processing server to process payment for redeemed ones of the at least one selected digital promotion based upon the redemption data.

3. The promotion processing system of claim 1 wherein the promotion processing server is configured to cooperate with the plurality of POS devices to process redemption of the at least one selected digital promotion.

4. The promotion processing system of claim 1 wherein the promotion parameter further comprises one of a promotion type and a promotion target demographic.

5. The promotion processing system of claim 1 wherein the desired promotion data comprises at least one of desired promotion objective data, desired product identifier data, and desired promotion rule data.

6. A promotion processing server comprising:
a processor and an associated memory configured to
store historical purchase data for a plurality of shoppers each associated with a shopper device,
cooperate with a brand user device to display a brand user device interface, on a brand user device associated with a brand, prompting for desired promotion data including desired overall promotion budget data, desired demographic data associated with a desired promotion, and desired promotion budget data for each of a plurality of promotion distribution networks,
cooperate with the brand user device to obtain the desired promotion data via the brand user device interface,
operate an artificial intelligence (AI) model accepting as input the desired promotion data and the historical purchase data and generating as output a plurality of recommended digital promotions for the plurality of promotion distribution networks,
communicate the plurality of recommended digital promotions to the brand user device for display at the brand user device,
communicate with the brand user device to prompt for selection of at least one selected digital promotion from the plurality of recommended digital promotions,
cooperate with the brand user device to obtain the at least one selected digital promotion,
operate the AI model to adjust a promotion parameter from among the plurality thereof for the at least one selected digital promotion and based upon the corresponding one of the plurality of promotion distribution networks, the plurality of promotion parameters comprising a promotion redemption value and a promotion quantity, communicate the at least one selected digital promotion with the corresponding adjusted promotion parameter to the corresponding promotion distribution network for display at the plurality of shopper devices via the respective promotion distribution network, communicate with a plurality of point-of-sale (POS) devices to obtain redemption data associated with the at least one selected digital promotion, the redemption data comprising a redemption rate and promotion cost, cooperate with the brand user device to determine a change in the desired promotion data, and further adjust one of the plurality of promotion parameters of unredeemed ones of the at least one selected digital promotion based upon the redemption data and a change in the desired promotion data.

7. The promotion processing server of claim 6, wherein the processor is configured to cooperate with the plurality of POS devices to process redemption of the at least one selected digital promotion.

8. The promotion processing server of claim 6 wherein the promotion parameter further comprises one of a promotion type and a promotion target demographic.

9. The promotion processing system of claim 6, wherein the desired promotion data further comprises at least one of desired promotion objective data, desired product identifier data, and desired promotion rule data.

10. A method of processing a promotion, the method comprising:

using a promotion processing server to store historical purchase data for a plurality of shoppers each associated with a shopper device, cooperate with a brand user device to display a brand user device interface, on a brand user device associated with a brand, prompting for desired promotion data including desired overall promotion budget data, desired demographic data associated with a desired promotion, and desired promotion budget data for each of a plurality of promotion distribution networks, cooperate with the brand user device to obtain desired promotion data via the brand user device interface, operate an artificial intelligence (AI) model accepting as input the desired promotion data and the historical purchase data and generating as output a plurality of recommended digital promotions for the plurality of promotion distribution networks, communicate the plurality of recommended digital promotions to the brand user device for display at the brand user device, communicate with the brand user device to prompt for selection of at least one selected digital promotion from the plurality of recommended digital promotions, cooperate with the brand user device to obtain the at least one selected digital promotion, operate the AI model to adjust a promotion parameter from among a plurality thereof for the at least one selected digital promotion and based upon the corresponding one of the plurality of promotion distribution networks, the plurality of promotion parameters comprising a promotion redemption value and a promotion quantity, communicate the at least one selected digital promotion with the corresponding adjusted promotion parameter to the corresponding promotion distribution network for display at the plurality of shopper devices via the respective promotion distribution network, communicate with a plurality of point-of-sale (POS) devices to obtain redemption data associated with the at least one selected digital promotion, the redemption data comprising a redemption rate and promotion cost, cooperate with the brand user device to determine a change in the desired promotion data, and further adjust one of the plurality of promotion parameters of unredeemed ones of the at least one selected digital promotion based upon the redemption data and a change in the desired promotion data.

11. The method of claim 10 wherein using the promotion processing server comprises using the promotion processing server to cooperate with a payment processing server to process payment for redeemed ones of the at least one selected digital promotion based upon the redemption data.

12. A non-transitory computer readable medium for processing a promotion, the non-transitory computer readable medium comprising computer executable instructions that when executed by a processor cause the processor to perform operations comprising:

storing historical purchase data for a plurality of shoppers each associated with a shopper device;

cooperate with a brand user device to display a brand user device interface, on a brand user device associated with a brand, prompting for desired promotion data including desired overall promotion budget data, desired demographic data associated with a desired promotion, and desired promotion budget data for each of a plurality of promotion distribution networks;

cooperating with the brand user device to obtain the desired promotion data via the brand user device interface;

operating an artificial intelligence (AI) model accepting as input the desired promotion data and the historical purchase data and generating as output a plurality of recommended digital promotions for the plurality of promotion distribution networks;

communicating the plurality of recommended digital promotions to the brand user device for display at the brand user device;

communicating with the brand user device to prompt for selection of at least one selected digital promotion from the plurality of recommended digital promotions;

cooperating with the brand user device to obtain the at least one selected digital promotion;

operating the AI model to adjust a promotion parameter from among a plurality thereof for the at least one selected digital promotion and based upon the corresponding one of the plurality of promotion distribution networks, the plurality of promotion parameters comprising a promotion redemption value and a promotion quantity;

communicating the at least one selected digital promotion with the corresponding adjusted promotion parameter to the corresponding promotion distribution network for display at the plurality of shopper devices via the respective promotion distribution network;

communicating with a plurality of point-of-sale (POS) devices to obtain redemption data associated with the at least one selected digital promotion, the redemption data comprising a redemption rate and promotion cost;

cooperating with the brand user device to determine a change in the desired promotion data; and further adjusting one of the plurality of promotion parameters of unredeemed ones of the at least one selected digital promotion based upon the redemption data and a change in the desired promotion data.

13. The non-transitory computer readable medium of claim 12 wherein the operations comprise cooperating with a payment processing server to process payment for redeemed ones of the at least one selected digital promotion based upon the redemption data.

\* \* \* \* \*